United States Patent
Mizawa et al.

(10) Patent No.: US 12,388,082 B2
(45) Date of Patent: *Aug. 12, 2025

(54) POSITIVE ELECTRODE ACTIVE MATERIAL FOR NON-AQUEOUS ELECTROLYTE SECONDARY BATTERY AND METHOD FOR PRODUCING SAME

(71) Applicants: PANASONIC HOLDINGS CORPORATION, Kadoma (JP); SANYO Electric Co., Ltd., Kadoma (JP)

(72) Inventors: Miki Mizawa, Hyogo (JP); Kaoru Nagata, Osaka (JP); Masanori Maekawa, Osaka (JP); Masahiro Kinoshita, Osaka (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 112 days.

This patent is subject to a terminal disclaimer.

(21) Appl. No.: 18/133,232

(22) Filed: Apr. 11, 2023

(65) Prior Publication Data

US 2023/0282817 A1  Sep. 7, 2023

Related U.S. Application Data

(63) Continuation of application No. 16/577,022, filed on Sep. 20, 2019, now Pat. No. 11,658,295, which is a (Continued)

(30) Foreign Application Priority Data

Mar. 31, 2017 (JP) .................... 2017-070700

(51) Int. Cl.
*H01M 4/00* (2006.01)
*H01M 4/36* (2006.01)
(Continued)

(52) U.S. Cl.
CPC .......... *H01M 4/485* (2013.01); *H01M 4/366* (2013.01); *H01M 4/525* (2013.01); *H01M 10/0525* (2013.01)

(58) Field of Classification Search
CPC ...... H01M 4/485; H01M 4/366; H01M 4/525; H01M 10/0525; H01M 10/052;
(Continued)

(56) References Cited

U.S. PATENT DOCUMENTS 11,658,295 B2 * 5/2023 Mizawa ............... H01M 4/366
                                                                429/223
2015/0104708 A1  4/2015  Bi et al.
(Continued)

FOREIGN PATENT DOCUMENTS

CN  104795556 A  7/2015
CN  106207250 A  12/2016
(Continued)

OTHER PUBLICATIONS

International Search Report dated May 1, 2018, issued in counterpart JP Application No. PCT/JP2018/004972 (2 pages).
(Continued)

*Primary Examiner* — Nicholas P D'Aniello
(74) *Attorney, Agent, or Firm* — WHDA, LLP

(57) ABSTRACT

This cathode active material for a secondary battery using a non-aqueous electrolyte includes nickel-rich lithium transition-metal oxide, exhibits a hard X-ray photoelectron spectroscopy (HAXPES) peak of 1,560 to 1,565 eV in binding energy from an Al-rich layer, using a photon energy of 6 KeV, and with respect to the mean particle diameter r of the
(Continued)

lithium transition-metal oxide particle, the Al concentration is approximately constant within 0.35 r of the center.

4 Claims, 6 Drawing Sheets

Related U.S. Application Data continuation of application No. PCT/JP2018/004972, filed on Feb. 14, 2018.

(51) Int. Cl.
    *H01M 4/485*     (2010.01)
    *H01M 4/525*     (2010.01)
    *H01M 10/0525*     (2010.01)

(58) Field of Classification Search
    CPC .............. H01M 2004/028; Y02E 60/10; C01P 2002/85; C01P 2002/54; C01P 2002/52; C01P 2004/61; C01P 2006/40; C01G 53/42
See application file for complete search history.

(56) References Cited

U.S. PATENT DOCUMENTS

| | | | |
|---|---|---|---|
| 2016/0351900 A1* | 12/2016 | Sekiya | .................. H01M 4/131 |
| 2017/0084916 A1 | 3/2017 | Oka et al. | |
| 2017/0294651 A1 | 10/2017 | Choi et al. | |
| 2017/0338488 A1 | 11/2017 | Sun et al. | |
| 2018/0108939 A1 | 4/2018 | Higuchi et al. | |
| 2018/0226646 A1 | 8/2018 | Furuichi et al. | |

FOREIGN PATENT DOCUMENTS

| | | |
|---|---|---|
| JP | 2010-129471 A | 6/2010 |
| JP | 2010-170741 A | 8/2010 |
| JP | 2015-69958 A | 4/2015 |
| KR | 10-0923442 B1 | 10/2009 |
| WO | 2015/141179 A1 | 9/2015 |
| WO | 2016/108376 A1 | 7/2016 |
| WO | 2016/157735 A1 | 10/2016 |
| WO | 2017/018099 A1 | 2/2017 |

OTHER PUBLICATIONS

Du, Ke et al., "Enhancing the Thermal and Upper Voltage Performance of Ni-Rich Cathode Material by a Homogeneous and Facile Coating Method": Spray-Drying Coating with Nano-Al2O3, Applied materials & Interfaces, Jun. 22, 2016, Issue27, p. 17713-17720; Cited in in JP Office Action dated Dec. 27, 2021. (8 pages).

English Translation of Search Report dated Dec. 27, 2021, issued in counterpart CN Application No. 201880014065.8. (2 pages).

English Translation of Chinese Search Report dated Dec. 9, 2022, issued in counterpart CN application No. 201880014065.8. (2 pages).

\* cited by examiner

POSITIVE ELECTRODE ACTIVE MATERIAL FOR NON-AQUEOUS ELECTROLYTE SECONDARY BATTERY AND METHOD FOR PRODUCING SAME

CROSS REFERENCE TO RELATED APPLICATIONS

This application is a Continuation of U.S. patent application Ser. No. 16/577,022, filed Sep. 20, 2019, which is a Continuation of a National Stage Entry of International Application No. PCT/JP2018/004972 filed Feb. 14, 2018, which claims the benefit of Japanese Patent Application No. 2017-070700 filed in the Japan Patent Office on Mar. 31, 2017, each of which is incorporated by reference herein in its entirety.

TECHNICAL FIELD

The present disclosure relates to a positive electrode active material for a non-aqueous electrolyte secondary battery and a method for producing the same.

BACKGROUND ART

A Ni-containing lithium transition metal oxide (e.g. $LiNiO_2$), which is one of the positive electrode active materials for a lithium ion secondary battery, has advantages that the capacity is high, as compared to a Co-containing lithium transition metal oxide (e.g. $LiCoO_2$), that nickel is less expensive and more stably available than cobalt, etc., and therefore is expected as a next generation positive electrode material.

Patent Literature 1 describes a positive electrode active material including Ni-containing lithium transition metal oxide particles and $LiAlO_2$-containing layers each provided at a portion of each surface of the Ni-containing lithium transition metal oxide particles, wherein Al derived from $LiAlO_2$ is dissolved to make a solid solution only in the vicinity of the surfaces of the lithium transition metal oxide particles. Specifically, it is described that when the lithium transition metal oxide particles have an average particle diameter r=8 to 30 μm, Al is dissolved to make a solid solution in a range of 0.2r.

CITATION LIST

Patent Literature

PATENT LITERATURE 1: Japanese Unexamined Patent Application Publication No. 2010-129471

SUMMARY

Making the outer layer portion of each lithium transition metal oxide particle Al-rich is preferable in light of thermal stability, but if the Al rich layer is formed to a several μm level, the capacity of the active material decreases.

An object of the present disclosure is to provide a positive electrode active material for a non-aqueous electrolyte secondary battery, the positive electrode active material capable of improving the thermal stability and suppressing the decrease in the capacity.

One aspect of the present disclosure is a positive electrode active material for a non-aqueous electrolyte secondary battery, wherein a peak of 1560 to 1565 eV in binding energy from an Al-rich layer exists in hard X-ray photoelectron spectroscopy (HAXPES) at a photon energy of 6 KeV, and when lithium transition metal oxide particles have an average particle diameter of r, an Al concentration is approximately constant within a range of 0.35r from the center.

In another aspect of the present disclosure, the Al-rich layer contains $LiAlO_2$.

In yet another aspect of the present disclosure, the Al concentration of the lithium transition metal oxide particles meets 0.99<(Al concentration at 0.35r)/(Al concentration at central portion)<1.01.

In yet another aspect of the present disclosure, within the range of 0.35r from the center, the lithium transition metal oxide particles consist of $Li_xNi_aCo_bAl_cM_dO_2$ wherein c meets c>0.03, and M represents at least one metal element selected from the group consisting of B, Si, Mg, Ge, Sn, Mg, Cr, Mn, Ti, Nb, Mo, and Fe.

In yet another aspect of the present disclosure, the Al-rich layer is a mixed body of $LiAlO_2$ and $LiNiCoAlO_2$.

A still yet another aspect of the present disclosure is a method for producing a positive electrode active material for a non-aqueous electrolyte secondary battery, the positive electrode active material including a nickel-containing lithium transition metal oxide, the method including the steps of: mixing NCA carrying lithium hydroxide or lithium carbonate on a surface thereof with an Al compound; and heating the NCA and the Al compound at 500° C. to 800° C.

According to one aspect of the present disclosure, a positive electrode active material for a non-aqueous electrolyte secondary battery, the positive electrode active material capable of improving the thermal stability and suppressing the decrease in the capacity, may be provided.

DESCRIPTION OF EMBODIMENTS

Figure 1A:
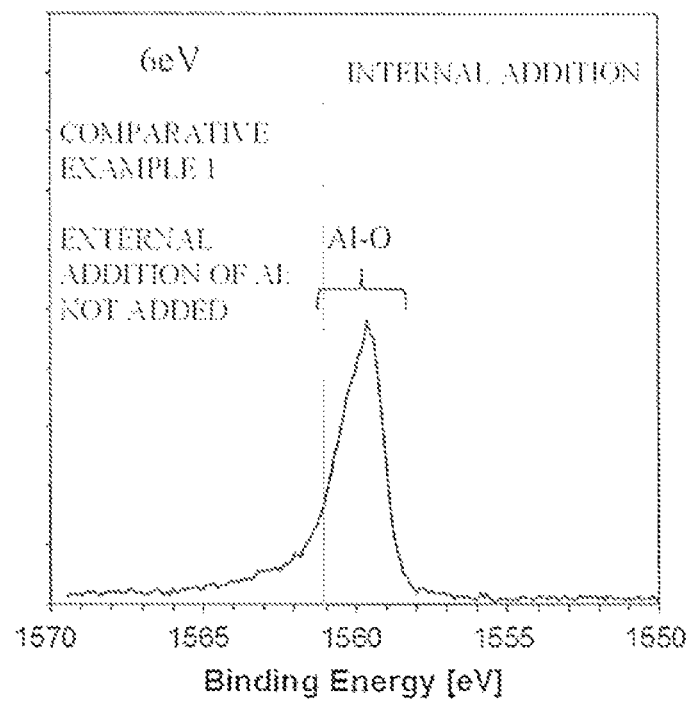
FIG. 1A shows the result of HAXPES analysis of Comparative Example.

By coating Ni-containing lithium transition metal oxide particles as a positive electrode active material with Al or the like, the thermal stability of the crystal can be improved, but on the other hand, if a high concentration of Al dissolves into the inside of the particles to make a solid solution, the large capacity characteristics peculiar to the Ni-containing lithium transition metal oxide are diminished.

There has conventionally been a technical idea of dissolving Al derived from $LiAlO_2$ to make a solid solution only in the vicinity of the surfaces, but the demand for the thermal stability and the demand for the large capacity have not been attained yet each at a high level.

As a result of earnest studies on various techniques for forming an Al-rich layer in the vicinity of the surfaces of the Ni-containing lithium transition metal oxide particles in the order of specifically several tens of nm, not in the order of several hundreds of nm, for example, in the order of 300 nm or less, the present inventors have found that by firing a transition metal oxide in a constant temperature range after adding a Li source and an Al compound thereto, the Li source and the Al compound are fused to diffuse Li and Al sufficiently inside the transition metal oxide particles, and an ultrathin Al-rich layer can be formed as the outer layer portion of each transition metal oxide particle.

The crystal structure is stabilized by diffusing and dissolving Al to make a solid solution in an approximately constant concentration inside the transition metal oxide particles. In addition, a reversible reaction of the lithium transition metal oxide with an electrolytic solution is suppressed by forming the ultrathin (e.g. 300 nm or less) Al-rich layer at the surface portions, so that the thermal stability can be improved. By forming the ultrathin Al-rich layer as the outer layer, a region not contributing to charge/discharge is limited to only a small portion of the outer layer, so that the decrease in the charge/discharge capacity can be suppressed.

Hereinafter, the constitution of a positive electrode active material for a non-aqueous electrolyte secondary battery, the positive electrode active material being one aspect of the present disclosure, will be described in detail.

The positive electrode active material for a non-aqueous electrolyte secondary battery, the positive electrode active material being one aspect of the present disclosure, comprises a Ni-containing lithium transition metal oxide.

For example, in light of the large capacity of the battery, the stability of the crystal structure, and the like, the proportion a of Ni in the Ni-containing lithium transition metal oxide is preferably in a range of 80 mol %≤a<100 mol %, and more preferably 85 mol %≤a<100 mol %.

The Ni-containing lithium transition metal oxide has, for example, a layered structure, and examples of the layered structure include a layered structure belonging to a space group R-3m and a layered structure belonging to a space group C2/m. Among these, the layered structure belonging to a space group R-3m is preferable in light of the large capacity, the stability of the crystal structure, and the like.

The Ni-containing lithium transition metal oxide is not particularly limited as long as it is a lithium transition metal oxide containing the above predetermined amount of Ni or Al, may contain another metal element, and is preferably a Ni-containing lithium transition metal oxide represented by, for example, the following composition formula.

$$Li_xNi_aCo_bAl_cM_dO_2 \qquad (1)$$

In the formula, x, a, b, c, and d preferably meet $0.95<x<1.05$, $0.80≤a<1$, $0<b<0.15$, $0≤d<0.15$, and $0.03<c$. In addition, M in the formula represents a metal element other than Ni, Co, and Al, and examples thereof include at least one metal element selected from the group consisting of B, Si, Mg, Ge, Sn, Mg, Cr, Mn, Ti, Nb, Mo, and Fe. Moreover, M may also be a metal element other than these metal elements.

In the composition formula (1), x represents the content (molar ratio) of lithium (Li) based on the total amount of Ni, Co, M, and Al. For example, in light of enabling improvement in the charge/discharge capacity of a non-aqueous electrolyte secondary battery, the content x of lithium in the composition formula (1) is preferably in a range of $0.95<x<1.05$, and more preferably in a range of $0.98<x≤1$.

In the composition formula (1), a represents the content (molar ratio) of nickel (Ni) based on the total amount of Ni, Co, M, and Al. For example, in light of enabling improvement in the charge/discharge capacity of a non-aqueous electrolyte secondary battery, the content a of nickel in the composition formula (1) is preferably in a range of $0.80≤a<1$, and more preferably $0.85<a<1$.

In the composition formula (1), b represents the content (molar ratio) of cobalt (Co) based on the total amount of Ni, Co, M, and Al. For example, in light of enabling improvement in the charge/discharge cycle characteristics and charge/discharge capacity of a non-aqueous electrolyte secondary battery, the content b of cobalt in the composition formula (1) is preferably in a range of $0<b<0.15$, and more preferably in a range of $0.03<b<0.12$ In the composition formula (1), d represents the content (molar ratio) of M based on the total amount of Ni, Co, M, and Al. For example, in light of enabling improvement in the charge/discharge cycle characteristics and charge/discharge capacity of a non-aqueous electrolyte secondary battery, the content d of M in the composition formula (1) is preferably in a range of $0<d<0.15$, and more preferably in a range of $0.005<d<0.1$.

In the composition formula (1), c represents the content (molar ratio) of aluminum (Al) based on the total amount of Ni, Co, M, and Al. For example, in light of enabling improvement in the charge/discharge cycles and thermal stability of a non-aqueous electrolyte secondary battery, the content c of aluminum in the composition formula (1) is preferably in a range of $0.03<c$, and more preferably in a range of $0.045<c≤0.1$. If the content of Al is too large, the charge/discharge capacity may be decreased.

The contents of elements that constitute the Ni-containing lithium transition metal oxide can be measured by an inductivity coupled plasma atomic emission spectrophotometer (ICP-AES), an electron probe micro analyzer (EPMA), an energy dispersive X-ray analyzer (EDX), or the like.

For example, in light of enabling improvement in the charge/discharge capacity of a non-aqueous electrolyte secondary battery, the content of the Ni-containing lithium transition metal oxide is preferably 90 mass % or more based on the total mass of the positive electrode active material for a non-aqueous electrolyte secondary battery, and more preferably 99 mass % or more.

The positive electrode active material for a non-aqueous electrolyte secondary battery according to the present embodiment may contain another lithium transition metal oxide in addition to the Ni-containing lithium transition metal oxide. Examples thereof include a lithium transition metal oxide having a Ni content of 0 mol % to less than 80 mol % and a lithium transition metal oxide obtained by allowing the lithium transition metal oxide to contain B, Si, another metal element, or the like.

As the synthesizing method for the Ni-containing lithium transition metal oxide, a transition metal oxide, a Li source, and an Al compound are added and fired at a temperature of 500° C. to 800° C. The transition metal oxide is, for example, (NiCoAlO₂) (NCA). The Li source is, for example, lithium carbonate or lithium hydroxide. The Al compound is, for example, Al(OH)₃. These are prepared and mixed according to each composition, and the mixture is fired at 500° C. to 800° C., for example, at about 700° C., in an oxygen atmosphere. Alternatively, NCA carrying lithium carbonate or lithium hydroxide at the surface thereof and an Al compound are mixed, and the mixture is then subjected to a heat treatment at 500° C. to 800° C., to thereby enable the externally added Al to be dissolved to make a solid solution inside NCA almost uniformly. The extent of dissolving Al to make a solid solution can be controlled by the temperature and time for the heat treatment. The present inventors have confirmed that by carrying out heating in a temperature range of 500° C. to 800° C. and a time range of 5 to 9 hours, Al is diffused sufficiently inside NCA, and an ultrathin Al-rich layer, specifically a mixed body of $LiAlO_2$ and $LiNiCoAlO_2$, can be formed as the outer layer.

Formation of the ultrathin Al-rich layer as the outer layer of each Ni-containing lithium transition metal oxide particle can be analyzed by hard X-ray photoelectron spectroscopy (HAXPES). The basic principle of the HAXPES, which is the same as that of general XPS, is to measure the kinetic energy of photoelectrons emitted by irradiating the surface of a sample with excitation light; however, the photon energy from an excitation source used in the hard X-ray photoelectron spectroscopy has a characteristic that it is 5 to 8 kV, which is greatly higher than the photon energy of 1486.6 eV which is most frequently used in XPS apparatuses, and therefore the information on deeper regions can be obtained by the HAXPES.

The average particle diameter r of the Ni-containing lithium transition metal oxide particles can be measured with a laser diffraction particle size analyzer.

The Al-rich layer preferably exists in an ultrathin manner as the outer layer of each Ni-containing lithium transition metal oxide particle, and for example, the thickness is preferably 300 nm or less, and more preferably 100 nm or less.

Al is preferably dissolved to make a solid solution in an approximately constant Al concentration in the inside of each particle excluding the outer layer. Specifically, it is preferable that the Al concentration is approximately constant to a range of the center of each particle to 0.35r, and more specifically, the Al concentration preferably meets 0.99<(Al concentration at 0.35r)/(Al concentration at central portion)<1.01.

In addition, the Al concentration in the range of the center of each particle to 0.35r is preferably 3 mol % or more. The reason is that if the Al concentration is too small, effects of stabilizing the crystal structure and improving the thermal stability are not sufficient, and if the Al concentration exceeds the concentration, the charge/discharge capacity may be decreased.

Hereinafter, one example of a non-aqueous electrolyte secondary battery to which the positive electrode active material for a non-aqueous electrolyte including the Ni-containing lithium transition metal oxide will be described.

The non-aqueous electrolyte secondary battery includes, for example, an electrode assembly having a positive electrode and a negative electrode wounded or laminated with a separator interposed therebetween; a nonaqueous electrolyte; and an exterior body for housing the electrode assembly and the non-aqueous electrolyte. The form of the non-aqueous electrolyte secondary battery is not particularly limited, and examples thereof include a cylindrical type, a rectangular type, a coin type, a button type, and a lamination type.

[Positive Electrode]

The positive electrode includes, for example, a positive electrode collector such as metal foil and a positive electrode active material layer formed on the positive electrode collector. Foil of a metal, such as aluminum or copper, that is stable in the electric potential range of the positive electrode, a film with such a metal disposed as an outer layer, and the like can be used for the positive electrode collector.

The positive electrode active material layer contains, for example, a positive electrode active material for a non-aqueous electrolyte secondary battery, the positive electrode active material including a Ni-containing lithium transition metal oxide; a conductive agent; and a binder.

As the conductive agent, for example, carbon materials such as carbon black, acetylene black, Ketjenblack, and graphite are used. For example, in light of improving the electrical conductivity of the positive electrode active material layer, the content of the conductive agent is preferably 0.1 to 30 mass % based on the total mass of the positive electrode active material layer, more preferably 0.1 to 20 mass %, and particularly preferably 0.1 to 10 mass %.

As the binder, for example, polytetrafluoroethylene (PTFE), poly (vinylidene fluoride), polyvinyl acetate, polymethacrylate, polyacrylate, polyacrylonitrile, polyvinyl alcohol, and the like are used. The binder may be combined with a thickener such as carboxymethyl cellulose (CMC) or poly (ethylene oxide) (PEO). For example, in light of improving the adhesiveness of the positive electrode active material layer with the positive electrode collector, the content of the binder is preferably 0.1 to 30 mass % based on the total amount of the positive electrode active material layer, more preferably 0.1 to 20 mass %, and particularly preferably 0.1 to 10 mass %.

[Negative Electrode]

The negative electrode includes, for example, a negative electrode collector such as metal foil and a negative electrode active material layer formed on the negative electrode collector. Foil of a metal, such as aluminum or copper, that is stable in the electric potential range of the negative electrode, a film with such a metal disposed as an outer layer, and the like can be used for the negative electrode collector. The negative electrode active material layer suitably contains a binder in addition to a negative electrode active material that can intercalate and deintercalate lithium ions. The negative electrode active material layer may also contain a conductive agent as necessary.

Examples of the negative electrode active material include natural graphite, artificial graphite, lithium, silicon, tin, germanium, aluminum, lead, indium, gallium, lithium alloys, carbon or silicon containing lithium intercalated therein in advance, and alloys thereof. As the binder, the same material as in the case of the positive electrode may be used; however, a styrene-butadiene copolymer (SBR) or its modified product is preferably used. The binder may be combined with a thickener such as CMC.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolytic solution) and may be a solid electrolyte using a gel polymer or the like. As the non-aqueous solvent, for example, esters, ethers, nitriles such as acetonitrile, amides such as dimethylformamide, and mixed solvents of two or more of these solvents can be used.

Examples of the esters include cyclic carbonate esters such as ethylene carbonate, propylene carbonate, and butylene carbonate; chain carbonate esters such as dimethyl carbonate, methyl ethyl carbonate, diethyl carbonate, methyl propyl carbonate, ethyl propyl carbonate, and methyl isopropyl carbonate; and carboxylate esters such as methyl acetate, ethyl acetate, propyl acetate, methyl propionate, ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The non-aqueous solvent suitably contains a halogen-substituted product formed by replacing a hydrogen atom of any of the above various solvents with a halogen atom such as fluorine. A fluorinated cyclic carbonate ester and a fluorinated chain carbonate ester are particularly preferable, and the two are more preferably mixed and used. Thereby, a good protection film is formed not only on the negative electrode but also on the positive electrode, so that the cyclic characteristics are improved. Suitable examples of the fluorinated cyclic carbonate ester include 4-fluoroethylene carbonate, 4,5-difluoroethylene carbonate, 4,4-difluoroethylene carbonate, 4,4,5-trifluoroethylene carbonate, and 4,4,5,5-tetrafluoroethylene carbonate. Suitable examples of the fluorinated chain carbonate ester include ethyl 2,2,2-trifluoroacetate, methyl 3,3,3-trifluoropropionate, and methyl pentafluoropropionate.

The electrolyte salt is preferably a lithium salt. Examples of the lithium salt include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (where l and m are integers of 1 or more), $LiC(C_pF_{2p+1}SO_2)(C_qF_{2q+1}SO_2)(C_rF_{2r+1}SO_2)$ (where p, q, and r are integers of 1 or more), $Li[B(C_2O_4)_2]$ (lithium bis(oxalate)borate (LiBOB)), $Li[B(C_2O_4)F_2]$, $Li[P(C_2O_4)F_4]$, $Li[P(C_2O_4)_2F_2]$, and $LiPO_2F_2$.

[Separator]

For example, an ion-permeable and insulating porous sheet is used as the separator. Specific examples of the porous sheet include a microporous thin film, woven fabric, and nonwoven fabric. Suitable examples of the material for the separator include olefin resins such as polyethylene and polypropylene, and cellulose. The separator may be a laminate including a cellulose fiber layer and a layer of fibers of a thermoplastic resin such as an olefin resin.

EXAMPLES

Hereinafter, the present disclosure will be further described by way of Examples, but is not limited to the following Examples.

Example 1

[Preparation of Positive Electrode Active Material (Ni-Containing Lithium Transition Metal Oxide)]

An NCA composite oxide containing a certain amount or more (3 to 4 mol %) of Al was prepared. Subsequently, the composite oxide, LiOH, and 1 mol % of Al (OH) 3 were mixed, the resultant was fired in an oxygen atmosphere at 715° C. for 5 hours, and impurities were then removed by washing with water, to thereby obtain a Ni-containing lithium transition metal oxide. The composition of the Ni-containing lithium transition metal oxide obtained above was measured using an ICP emission spectroscopic analyzer ("iCAP6300" (product name) manufactured by Thermo Fisher Scientific, Inc.). As a result, the composition ratio of Ni, Co, and Al in the precursor was Ni:Co:Al=92.5:4.0:3.5 in terms of mol %, and the composition ratio of Ni, Co, and Al in the obtained final oxide was Ni:Co:Al=91.0:4.5:4.5.

The particle diameters were measured with a laser diffraction particle size analyzer to find the average particle diameter r=18 μm.

A particle section was subjected to surface analysis with EPMA (wavelength dispersive type) to find that the concentration distribution of Al was not observed, and the particle section was analyzed by HAXPES setting the photon energy of 6 KeV to confirm that a peak exists at 1561 eV in binding energy. Accordingly, it is inferred that an Al-rich layer of less than 300 nm is formed as an outer layer.

Further, qualitative analysis for the Al concentration was performed at a position of the central portion of a Ni-containing lithium transition metal oxide particle and at right and left positions of 0.35r from the center in the plan view of the particle to confirm that the intensities (a.u) were as follows.

Position of 0.35r on the left side: 283.5
Position of the central portion: 283.5
Position of 0.35r on the right side: 279.5

This was used as a positive electrode active material of Example 1.

[Production of Positive Electrode]

Mixed were 85 mass parts of the above positive electrode active material, 10 mass parts of acetylene black as a conductive agent, and 5 mass parts of poly (vinylidene fluoride) as a binder. The mixture was kneaded with an agate mortar to prepare a positive electrode mixture. Subsequently, the positive electrode mixture was formed into a pellet. This was used as a positive electrode.

[Preparation of Non-Aqueous Electrolyte]

Ethylene carbonate (EC) and methyl ethyl carbonate (MEC) were mixed in a volume ratio of 3:7. Lithium hexafluorophosphate ($LiPF_6$) was dissolved in the mixed solvent at a concentration of 1.0 mol/L to prepare a non-aqueous electrolyte.

[Production of Test Cell]

The above positive electrode and a negative electrode composed of lithium metal foil were laminated so as to face each other with a separator interposed therebetween, to thereby produce an electrode assembly. Subsequently, the electrode assembly and the above non-aqueous electrolyte were inserted into an exterior body made of aluminum to produce a test cell.

Example 2

A Ni-containing lithium transition metal oxide was produced in the same manner as in Example 1, except that the amount of Al (OH) 3 was doubled to 2 mol % while the composition ratio of NCA was retained approximately the same, and the heating temperature was 735° C. in the preparation of the positive electrode active material.

The composition ratio of Ni, Co, and Al in the precursor was

Ni:Co:Al=93.5:3.0:3.5 in terms of mol %, and the composition ratio of Ni, Co, and Al in the obtained final oxide was Ni:Co:Al=91.6:2.9:5.5.

The particle diameters were measured with a laser diffraction particle size analyzer to find the average particle diameter r=12 μm.

A section was subjected to surface analysis with EPMA (wavelength dispersive type) to find that the concentration distribution of Al was not observed, and the section was analyzed by HAXPES setting the photon energy of 6 KeV to confirm that a peak exists at 1561 eV in binding energy.

Accordingly, it is inferred that an Al-rich layer of less than 300 nm is formed as an outer layer.

Further, qualitative analysis for the Al concentration was performed at a position of the central portion of the Ni-containing lithium transition metal oxide particle and at right and left positions of 0.35r from the center in the plan view of the particle to confirm that the intensities (a.u) were as follows.

Position of 0.35r on the left side: 385.5
Position of the central portion: 382.5
Position of 0.35r on the right side: 382

This was used as a positive electrode active material of Example 2 to produce a test cell in the same manner as in Example 1.

Example 3

A Ni-containing lithium transition metal oxide was produced in the same manner as in Example 2, except that the amount of Al(OH)$_3$ was further increased to 3 mol % while the composition ratio of NCA was retained approximately the same in the preparation of the positive electrode active material. The composition ratio of Ni, Co, and Al in the precursor was Ni:Co:Al=93.5:3.0:3.5 in terms of mol %, and the composition ratio of Ni, Co, and Al in the obtained final oxide was Ni:Co:Al=90.6:2.9:6.5.

The particle diameters were measured with a laser diffraction particle size analyzer to find the average particle diameter r=12 μm. This was used as a positive electrode active material of Example 3 to produce a test cell in the same manner as in Example 1.

Comparative Example 1

A Ni-containing lithium transition metal oxide was produced in the same manner as in Example 1, except that Al(OH)$_3$ was not added while the composition ratio of NCA was retained approximately the same in the preparation of the positive electrode active material.

The composition ratio of Ni, Co, and Al in the precursor was

Ni:Co:Al=91.0:4.5:4.5 in terms of mol %, and the composition ratio of Ni, Co, and Al in the obtained final oxide was Ni:Co:Al=91.0:4.5:4.5.

The particle diameters were measured with a laser diffraction particle size analyzer to find the average particle diameter r=18 μm. This was used as a positive electrode active material of Comparative Example 1 to produce a test cell in the same manner as in Example 1.

Figure 1B:
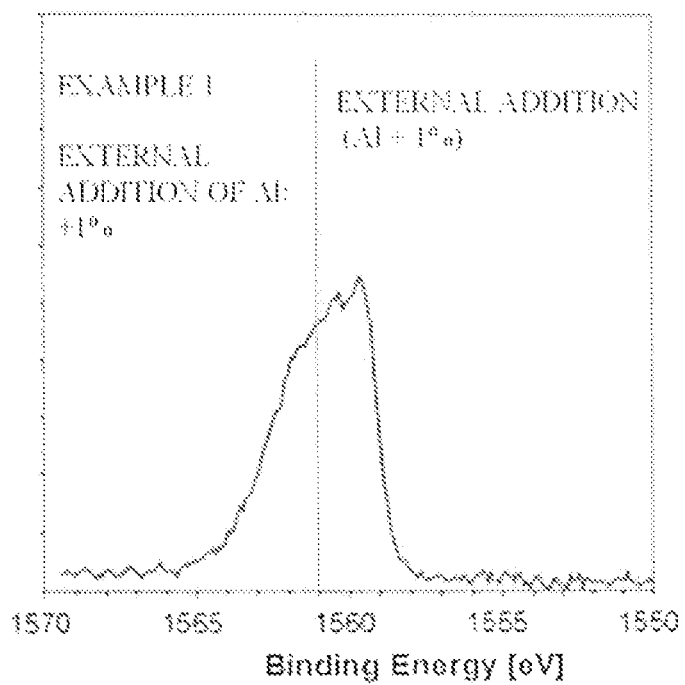
FIG. 1B shows the result of HAXPES analysis of Example 1.
Figure 1C:
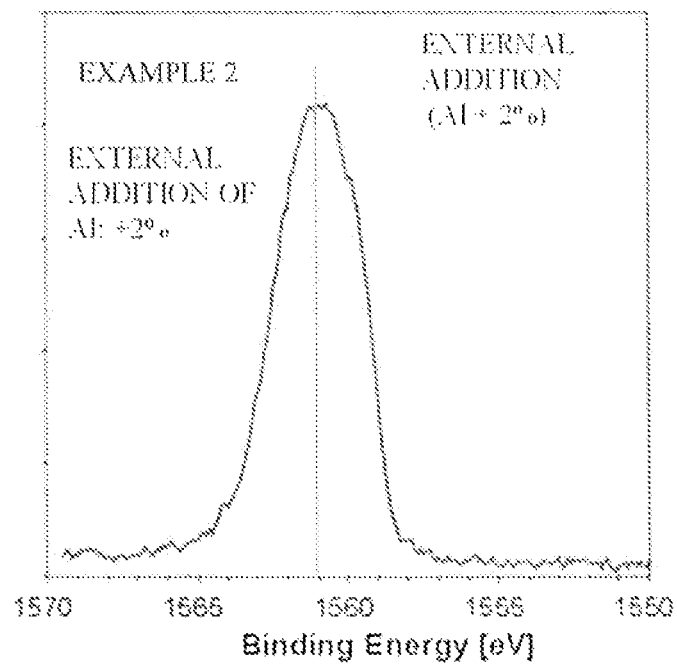
FIG. 1C shows the result of HAXPES analysis of Example 2.

FIG. 1A to FIG. 1C show analysis results of Examples 1 to 2 and Comparative Example 1 by HAXPES at a photon energy of 6 KeV. FIG. 1A shows an analysis result of Comparative Example 1, FIG. 1B shows an analysis result of Example 1, and FIG. 1C shows an analysis result of Example 2. When attention is paid to the binding energy of 1560 to 1565 eV, a peak did not appear in Comparative Example 1 where Al(OH)$_3$ was not added, and a peak appeared in Example 1 and Example 2. The photon energy of 6 KeV corresponds to about several tens of nm from the surface of a particle, and it can be seen that an Al-rich layer does not exist at this position in Comparative Example 1, but an Al-rich layer exists in Example 1 and Example 2. That the peak value is larger in Example 2 than in Example 1 is because the amount of Al added was larger in Example 2 than in Example 1.

Figure 2A:
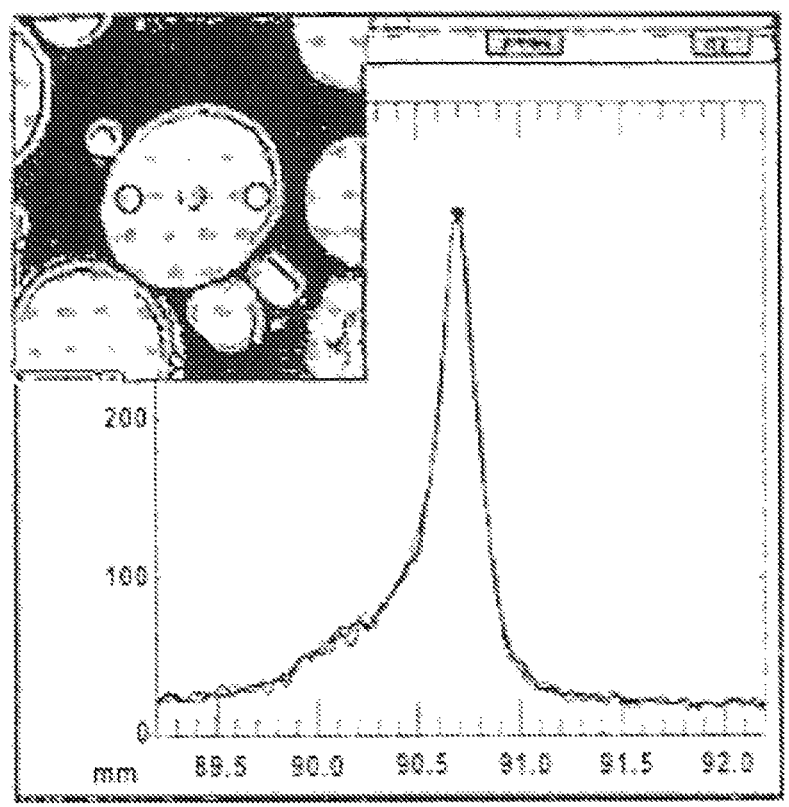
FIG. 2A shows the result of Al concentration distribution analysis of Comparative Example 1.
Figure 2B:
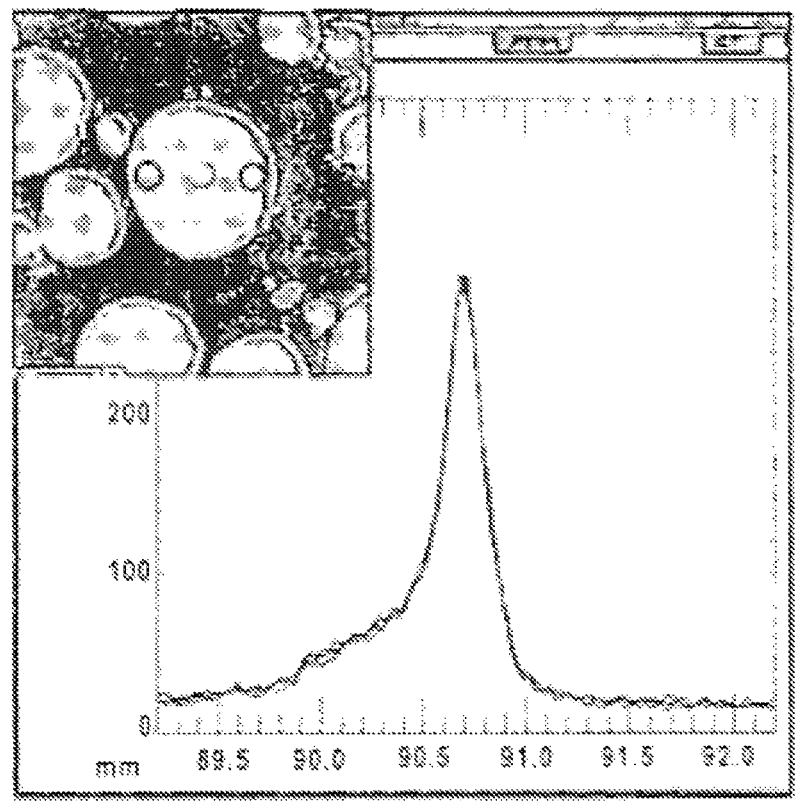
FIG. 2B shows the result of Al concentration distribution analysis of Example 1.
Figure 2C:
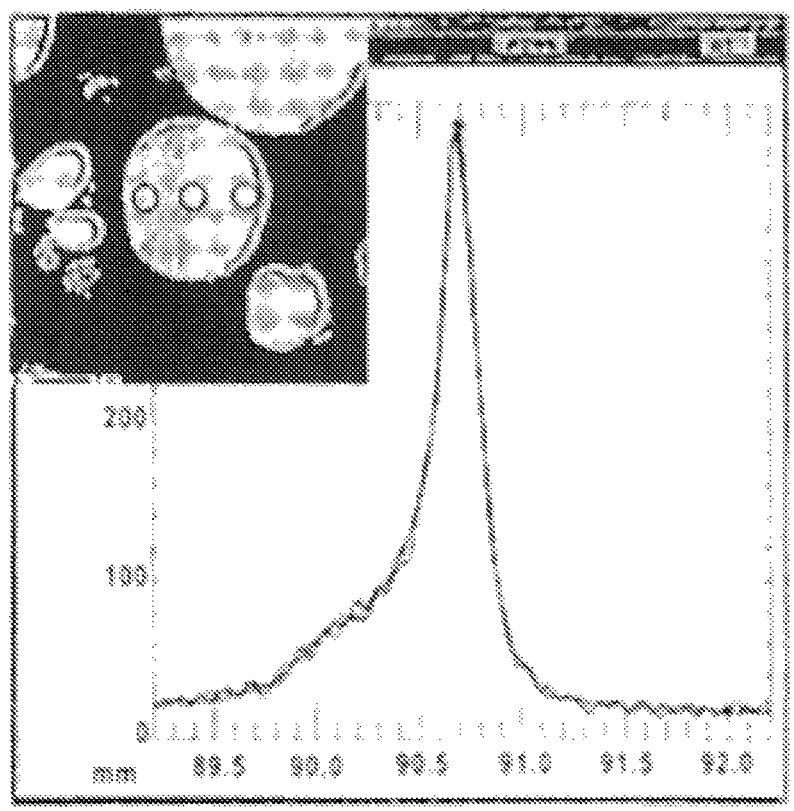
FIG. 2C shows the result of Al concentration distribution analysis of Example 2.

FIG. 2A to FIG. 2C show measurement results of Examples 1 to 2 and Comparative Example 1, where the qualitative analysis of the Al concentration in the particle section was performed by EPMA, and measurement positions for the Al concentration. FIG. 2A shows a result of Comparative Example 1, FIG. 2B shows a result of Example 1, and FIG. 2C shows a result of Example 2. The circle marks in the particle section show the measurement positions and respective marks show the position of 0.35r on the left side, the position of the central portion, and the position of 0.35r on the right side.

Table 1 shows the measurement results of Comparative Example 1 and Examples 1 and 2.

TABLE 1

|  | 0.35r on left side | Center | 0.35r on right side |
| --- | --- | --- | --- |
| Comparative Example 1 | 328(0.99) | 332 | 331(1.00) |
| Example 1 | 283.5(1.00) | 283.5 | 279.5(0.99) |
| Example 2 | 385.5(1.01) | 382.5 | 382(1.00) |

In Table 1, numerical values in parentheses each represent a ratio=(0.35r on left side or 0.35r on right side)/(central portion). That is, Comparative Example 1 shows that the Al concentration at 0.35r on the left side to that in the central portion is 0.99, and the Al concentration at 0.35r on the right side to that in the central portion is 1.00. In Example 1, the Al concentration at 0.35r on the left side to that in the central portion is 1.00, and the Al concentration at 0.35r on the right side to that in the central portion is 0.99. In Example 2, the Al concentration at 0.35r on the left side to that in the central portion is 1.01, and the Al concentration at 0.35r on the right side to that in the central portion is 1.00.

[Initial Charge/Discharge Test]

The test cells of Examples 1 to 3 and Comparative Example 1 were used to carry out a constant current charging at a current of 11 mA to a voltage of 4.3 V and subsequently carry out a constant voltage charging at 4.3 V to a current of 2.75 mA at a temperature of 25° C. Thereafter, a constant current discharging was carried out at 11 mA to a voltage of 2.5 V. The charge capacity and the discharge capacity obtained from each test cell by one cycle of this charge/discharge test were defined as the initial charge capacity and the initial discharge capacity (mAh/g).

[Measurement of Exothermic Onset Temperature]

The test cells of Examples 1 to 3 and Comparative Example 1 after the initial charge/discharge test were each disassembled in a state of being charged to 4.3 V to take out only the positive electrode, and the positive electrode was dried and then sealed in a sample container in accordance with the Fire Service Act to perform DSC measurement in a range of 25° C. to 300° C. with an apparatus of Thermo plus DSC8230 manufactured by Rigaku Corporation. The exothermic onset temperature was defined as the temperature where the calorific value after blank correction reaches 0.02 mW/g.

The results of Comparative Example 1 and Examples 1 to 3 are shown in Table 2.

TABLE 2

| | Base material | Amount added mol % | Heat treatment temperature °C. | Particle diameter μm | Firing temperature °C. | Capacity mA/I | Exothermic onset temperature °C. |
|---|---|---|---|---|---|---|---|
| Comparative Example 1 | NCA | 0 | 715 | 18 | 715 | 222 | 146 |
| Example 1 | NCA | 1 | 715 | 18 | 715 | 223 | 149 |
| Example 2 | NCA | 2 | 735 | 12 | 735 | 216 | 150 |
| Example 3 | NCA | 3 | 735 | 12 | 735 | 210 | 154 |

In Table 2, the amount added represents the amount (mol %) of Al (OH) 3 added. The amount added is 0 mol % in Comparative Example 1 because Al (OH) 3 was not added, and in Examples 1 to 3, the amount added is increased in stages from 1 mol % to 2 mol %, and 3 mol %.

The exothermic onset temperature is 146° C. in Comparative Example 1 but is increased in stages from 149° C., 150° C., and 154° C. in Examples 1 to 3. On the other hand, the capacity is 222 mAh/g in Comparative Example 1, and no significant decrease is seen in Examples 1 to 3 although the capacity decreases a little from 223 to 216 and 210 mAh/g in Examples 1 to 3. Accordingly, it can be seen that in Examples 1 to 3, as compared to Comparative Example 1, there is no significant decrease in capacity, and the exothermic onset temperature is high, so that the thermal stability is improved. In addition, it can also be seen that both the suppression of a decrease in capacity and the improvement in thermal stability can be attained by adjusting the amount of Al (OH) 3 to be added. From these results, it can be said that by forming an ultrathin Al-rich layer as the outer layer of a Ni-containing lithium transition metal oxide and making the amount of Al from the central portion to 0.35r approximately constant, the thermal stability can be improved while the capacity is retained.

The invention claimed is:

1. A positive electrode active material for a non-aqueous electrolyte secondary battery, including a nickel-containing lithium transition metal oxide, wherein
    a proportion of Ni in the nickel-containing lithium transition metal oxide being not less than 80 mol %,
    a peak of 1560 to 1565 eV in binding energy from an Al-rich layer exists in hard X-ray photoelectron spectroscopy (HAXPES) at a photon energy of 6 KeV, and when lithium transition metal oxide particles have an average particle diameter of r, an Al concentration is approximately constant within a range of 0.35r from the center,
    wherein the Al-rich layer contains $LiAlO_2$,
    wherein the Al-rich layer has a thickness of 100 nm or less,
    wherein aluminum is dissolved to form a solid solution inside the lithium transition metal oxide particles, and
    wherein the Al-rich layer is a mixed body of $LiAlO_2$ and an oxide containing Li, Ni, Co, and Al.

2. The positive electrode active material for a non-aqueous electrolyte secondary battery according to claim 1, wherein the Al concentration of the lithium transition metal oxide particles meets 0.99<(Al concentration at 0.35r)/(Al concentration at central portion)<1.01.

3. The positive electrode active material for a non-aqueous electrolyte secondary battery according to claim 1, wherein the Al concentration within the range of 0.35r from the center is 3 mol % or more.

4. The positive electrode active material for a non-aqueous electrolyte secondary battery according to claim 1, wherein aluminum is dissolved to form the solid solution in an approximately constant Al concentration within the range of 0.35r from the center inside the lithium transition metal oxide particles.

* * * * *